United States Patent [19]

Hayashibara et al.

[11] 3,973,050
[45] Aug. 3, 1976

[54] CONTAINING LACTITOL AS A SWEETENER

[75] Inventors: Ken Hayashibara; Kaname Sugimoto, both of Okayama, Japan

[73] Assignee: Hayashibara Company, Okayama, Japan

[22] Filed: Jan. 8, 1969

[21] Appl. No.: 789,934

[30] Foreign Application Priority Data
Jan. 16, 1968    Japan.................................. 43-2279

[52] U.S. Cl................................. 426/552; 426/567; 426/580; 426/587; 426/590; 426/592; 426/658
[51] Int. Cl.²......................................... A21D 13/08
[58] Field of Search................ 99/141, 141 A, 142; 260/209; 426/552, 567, 580, 587, 590, 592, 658

[56] References Cited
UNITED STATES PATENTS

| | | | |
|---|---|---|---|
| 2,311,235 | 7/1941 | Kuderman | 99/141 |
| 2,917,390 | 12/1959 | Apel | 99/142 |

FOREIGN PATENTS OR APPLICATIONS 1,317,216    5/1961    France

OTHER PUBLICATIONS

Rose, Condensed Chemical Dictionary, Reinhold Book Corporation, 7th Edition 1968 p. 541.

*Primary Examiner*—Raymond N. Jones
*Attorney, Agent, or Firm*—Browdy and Neimark

[57] ABSTRACT

The use of lactitol as a combined sweetening agent and agent for adding solid volume, body, moisture absorbance, luster and increased viscosity to low caloric foods and drinks.

6 Claims, No Drawings

CONTAINING LACTITOL AS A SWEETENER

This invention relates to a process for preparing foods and drinks of intensified sweetness with no increases in the caloric values.

For added sweetness of foods and drinks, it has been customary to use sugars and sugar alcohols, such as cane sugar, grape sugar, fruit sugar, starch syrup, honey and sorbitol, and artificial sweetening agents such as saccharin and cyclohexyl-sodium sulfamate. These sugars and sugar alcohols are invariably crystallizable and easily form crystals in the food products under the influence of temperature or at high concentrations. The artificial sweetening materials have rather poor solubility and provide too high degrees of sweetness to attain the purpose of increasing the solid volume of foods and drinks as by the natural sweetenings. These properties of the common sweetening materials offer inconveniences in use and limit their applications. A further disadvantage is that, not to mention the sugars, the sugar alcohols are absorbed and digested by the human body and, for that reason, cannot be used in the preparation of foods and drinks of low- or non-caloric value, or dietetic or fat-reducing diets required by diabetics and stout persons.

The present invention is directed to the elimination of the foregoing disadvantages, and has for an object to provide foods and drinks having necessary sweetness by adding lactitol to food materials thereby providing sweetness like that of grape sugar and which may be mixed with other artificial sweetenings such as saccharin and hence can provide freely adjustable sweetness.

Another object of the invention is to provide foods and drinks such as sponge cakes, sweet jelly of beans and concentrated juices having high degrees of sweetness which are protected against crystallization of, or whitening by, the sweetening source by adding lactitol as a sweetening source which has no possibility of crystallization even if used at high concentrations.

Still another object of the invention is to provide foods and drinks of low or no energy value per unit of weight suitable as dietetic or fat-reducing diets for diabetics and corpulent persons by adding lactitol in the preparation of the food products as a sweetening source which is never digested or absorbed by the human body.

Yet another object of the invention is to provide foods and drinks which stimulate the appetite by adding to the food materials lactitol as a sweetening source which enables the food products to retain or absorb moisture to an adequate level and have increased viscosity to possess the same substance, body and luster as those of sugary foods, and which permits the flavorings and colorants used to be maintained in stabilized state.

A further object of the present invention is to provide foods and drinks containing lactitol as a sweetening source which is extremely stabilized against heat and is capable of imparting sweetness to food products prepared by the application of heat, such as baked cakes, without any possibility of decomposition and coloration of the sweetening source by heat.

Thus, the present invention concerns a process for preparing foods and drinks characterized by the use of lactitol as a sweetening agent therefor which is non-crystallizable, highly soluble, capable of retaining moisture, can confer stability on flavorings and colorants, and has no food value per se.

Lactitol which is used in the practice of the present invention is a reduction product of lactose that has heretofore found no application at all in the food industry. Lactose, from which lactitol is made, is a slightly sweet sugar obtained from milk. It has relatively limited applications, e.g. in the preparation of renovated milk and medicines, and is available at low cost.

Lactose is a well-known name of a compound, 4-0-[β-D-galactopyranosyl]-D-glucopyranose, as represented by the following formula:

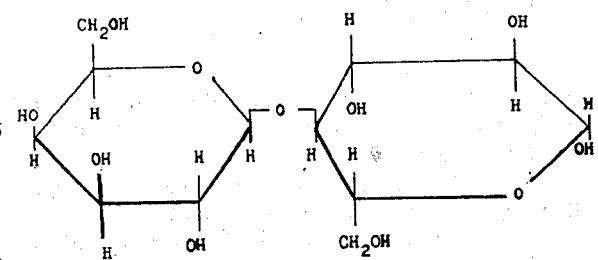

Therefore, lactitol obtained by having one mole of hydrogen quantitatively absorbed by the lactose is a polyhydric alcohol of the following structural formula:

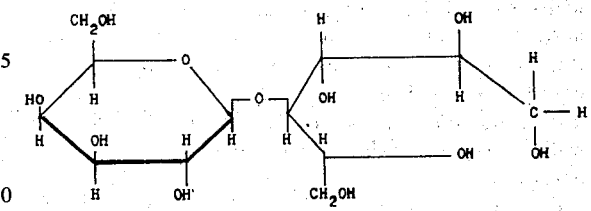

An exemplary procedure for the production of lactitol is as follows. To pure lactose in the form of a 30% aqueous solution is added 8% Raney nickel as a reduction catalyst. The mixture is gradually heated to 100°–130°C. with constant stirring. By introducing hydrogen at a pressure of 50 – 100 kg/cm$^2$ the mixture is caused to absorb the hydrogen at a rate of one mole per mole of lactose. After cooling, the reaction mixture is freed of the Raney nickel and is purified in the usual manner by the use of active carbon and ion exchange resin. The product upon concentration yields a lactitol solution in a colorless, transparent and viscous state.

Lactitol obtained in this way showed upon analysis no trace of direct reducing sugar, thus indicating that it had become a polyhydric alcohol. It yielded 50% of whole sugar. This means that galactose equivalent to ½ molecule had been formed by the hydrolysis, and the result demonstrated that the product was pure lactitol.

Investigations on the adaptability of this lactitol for use as an additive to foods and drinks have led to the following findings:

1. Sweetness

A panel test on sweet taste showed that the sweetness of this substance is mild and refreshing and leaves no thick taste behind.

As for the intensity of sweetness, lactitol is milder than sucrose and is comparable to dextrose.

It is by far sweeter than lactose, the starting material.

It is well harmonized with saccharin, sodium cyclamate and other artificial sweetening agents, and its sweetness can be freely adjusted thereby.

2. Non-crystallinity

Even at fairly high concentrations, lactitol scarcely crystallizes. When mixed with sucrose and dextrose, it also serves to avoid the crystallization of those sugars.

3. Non-caloric value

Lactitol has no caloric value because it is not digested or absorbed by digestive organs of the higher animal.

This was demonstrated by experiments with live rabbits. The intestines of test rabbits not fed for 24 hours beforehand were closed at both ends and were injected with a 20% aqueous solution of lactitol or an equimolecular amount of a sucrose solution each. After the lapse of several hours, the sugar or sugar alcohol left in the intestines was estimated. It was then found that, while 85% of the sucrose intake had been lost due to absorption and digestion, lactitol had shown no loss, thus proving its impossibility of being absorbed and digested by the digestive organs. It was also found that lactitol has no harmful stimulus because the intestinal walls exposed to it showed no irregularity such as congestion.

Recent reports have disclosed that xylose and sorbitol, both known as non-caloric sweetening materials, are actually metabolized and cannot be as non-caloric as lactitol.

Thus, lactitol has no energy value as food and, in addition, can improve the palatability of foods with sweetness and body. For these reasons it is essential for the preparation of non-caloric drinks and edibles.

4. Moisture retention and viscosity

The remarkable moisture-retaining property and viscosity of lactitol are naturally expected from its chemical structure.

With a molecular weight of 360 which is comparable to that of sugar and by the breakage of the pyranose ring of glucose by reduction, lactitol has a branched, complicate steric structure. Moreover, because it has nine hydroxyl groups, lactitol displays a remarkable influence of hydrogen bonds and has great moisture-retaining and moisture-absorbing properties. It thus serves as a stabilizer generally for flavorings and colorants that have polarity. Further, the inter-molecular action of lactitol combines with the steric structure of the compound to give luster to foods.

5. Thermal stability

In lactitol the reducing group of lactose is stabilized by hydrogenation, and therefore it is obvious that lactitol is more stable against heat than lactose. Ordinarily lactose is very stable thermally as compared with glucose, sucrose, fructose, xylose, etc., and is decomposed at melt temperatures ranging from 200° to 260°C. Lactitol is even more stable. It is dehydrated while being vaporized at 250°C. By virtue of this extreme stability against heat, it can be used as an additive to many different foods and drinks with no danger of decomposition or coloration upon various heat treatments.

As described hereinabove, lactitol has not only beneficial properties as an additive to food products but has such additional features as sweetness and non-caloric value. It therefore can satisfy the requirements for the preparation of non-caloric foods and drinks. The present invention is illustrated by the following examples.

EXAMPLE 1

Preparation of carbonated drinks

A carbonated lemon drink is prepared in accordance with the present invention by the use of the standard recipe given in the National Bottler Gazette, March issue (1939). That is, the drink so prepared has saccharinity of 10.9, $CO_2$ gas volume of 3.5, and acidity adjusted with critic acid or the like to 0.145. In addition to suitable amounts of colorant and flavoring, lactitol is used as a sweetening material to the mixture in order to give body. Lactitol blends well with acid to provide a pleasant after taste and ensure thorough distribution of the flavor. Further, this sweetening agent which has no food value itself makes it possible to produce an ideal non-calorific drink for dietetic purpose. Other refreshing drinks such as Colas can be made in the same way.

Since lactitol is quite compatible with other sweetenings, artificial or natural, the intensity of its sweetness may be adjusted by the use of another artificial agent, for example, to attain best palatability.

EXAMPLE 2

Preparation of concentrated sirup

A recipe for preparing 100 liters of a concentrated sirup containing orange juice in accordance with the present invention is as tabled below:

| | |
|---|---|
| Concentrated (⅕) orange juice | 7.500 l |
| 75% lactitol solution | 75.960 |
| 50% citric acid solution | 1.976 |
| Orange base | 0.500 |
| Orange essence | 0.250 |

|         |        |
|---------|--------|
| -continued | |
| Water   | 13.814 |

Lactitol blends particularly well with orange juice, and, unlike sugar, it will not crystallize at high concentrations and therefore can increase the overall concentration of the sirup with a sharp reduction of the proportion of water.

If necessary, the sweetness can be suitably increased by the addition of saccharin or sodium cyclamate.

EXAMPLE 3

Preparation of ice cream

Ice cream is prepared by the following recipe:

| | |
|---|---|
| Milk fat | 10 % |
| Skim milk powder | 11 % |
| Lactitol | 20 % |
| Stabilizer | 0.2 % |
| Artificial sweetening | Suitable amount |
| Flavoring | Suitable amount |
| Water | 58.5 % |

When a mixture of the above formulation is processed in the usual manner into ice cream, the product has a smooth texture and good body. With very good over run, the cream has quite refreshing, balanced flavor. Still it is a non-calorie food.

EXAMPLE 4

Preparation of "Youkan" (sweet jelly of beans)

Mashed beans and lactitol in substantially equal amounts are mixed up and a suitable amount of agar is added. The whole mixture is kneaded up with heat in the usual manner to a water content of about 26 percent. The paste thus obtained is shaped as by molding and packed.

Due to the high thermal resistance, lactitol will not be baked in the course of the kneading with heat, but will keep the mixture in the tint desired. It does not crystallize and provides a jelly with such fine luster and taste that stimulate the appetite. If necessary, the sweetness can be adjusted with the use of sodium cyclamate.

"Youkan" made in this way is a low-calorie food because its caloric value is about one-third the values of conventional products.

EXAMPLE 5

Preparation of Western cake

A typical formulation for the preparation of a sponge cake in accordance with the invention is as given below.

| | |
|---|---|
| Lactitol (anhydrous) | 940 g. |
| Egg | 1,100 g. |
| Flour | 900 g. |
| BP | 10 g. |
| Monoglyceride | Suitable amount |
| Vanilla | 6 g. |
| Water | 200 cc. |

These ingredients are mixed in the usual manner to form a dough. The dough is spread over a sheet of paper laid on an iron plate, and is baked in an oven. After cooling, it is suitably decorated on the surface according to the amount charged, and thus a sponge cake is obtained.

No scorching will occur during the course of baking, and the product is rendered soft and maintains suitable moisture. Thus, a flavory cake resistant to aging is made.

With a carbohydrate content about half those of ordinary products, the cake is a low-calorie food.

EXAMPLE 6

Preparation of canned food

In the case of canned oranges, the fruit is packed in cans in the usual manner and the cans are filled with a sirupy solution according to the invention. To 50 kg. of lacitol (in anhydrous state) are added 100 g. of sodium cyclamate and 30 g. of saccharin. With the addition of water, a total of 100 kg. of a sirupy solution is obtained.

This solution has suitable viscosity and is harmonious with sourness. It retains the flavor of the fruit and is non-caloric per se.

EXAMPLE 7

Preparation of bottled marrons in sirup

Chestnuts with the astringent skin peeled off are allowed to stand overnight in water. Then, with the addition of 0.1 to 0.3% alum, the nuts in water are boiled to stiffen the meat and keep the shape. After the removal of water, the nuts are immersed in a 50% lactitol solution, heated at 80°C. for 10 minutes, and then are left as they are. On the following day, 0.3% of sodium cyclamate and 0.4% of saccharin, both on the basis of the amount of a 70% aqueous solution of lactitol, are added to the latter solution. The mixture is diluted to a solution in which the lactitol content is between 50 and 65 percent. Together with 110 g. of the sirup thus obtained, the marrons prepared as above are bottled.

In the manner described the marrons are completely kept from coloration due to reducing sugar and have fine yellowish color. With suitably stiffened meat and beautiful luster, the marrons have pleasant sweetness. Thus, lactitol permits the preparation of marrons soaked in sirup which has heretofore been impossible without the aid of sugar. Further, because the sirup has no food value, the product can serve as a low-calorie food with a caloric value reduced to one half or less those of ordinary ones.

EXAMPLE 8

Preparation of artificial "sake"

An exemplary recipe in accordance with the invention is given below:

| | |
|---|---|
| Alcohol (90%) | 810 ltr. |
| Lactitol | 150 kg. |
| Sodium cyclamate | 1 kg. |
| Sodium glutamate | 600 g. |
| Succinic acid | 3,900 g. |
| Lactic acid (75%) | 770 g. |
| Potassium hydrogen phosphate | 330 g. |
| Calcium hydrogen phosphate | 330 g. |
| Sodium succinate | 650 g. |
| Sodium chloride | 600 g. |
| Arach ne-glycine | 350 g. |
| Fermented liquor for seasoning | 450 ltr. |

With the addition of water to the compostion to an overall volume of 5400 l, the whole solution is kept still in cool place and, after screening, it is aged for one month. The "sake" thus prepared is pasteurized at 50°C. and bottled.

This synthesized "sake" has the extract content and consistency demanded of natural, fermented "sake," and has good body. Free from sugar and with nearly no caloric value, the product may well be called a non-calorie artificial "sake." It features stable body and flavor and well balanced taste.

EXAMPLE 9

Preparation of white wine

After removal of their skins and stones, grapes are squeezed to yield juice. Potassium pyrosulfite is added to the juice to inhibit the growth of infectious microbes and seed mash is added for fermentation purpose. Upon completion of the fermentation, suitable proportions of lactitol and alcohol are incorporated. The whole solution is then casked and fermented. Subsequently it is stored and bottled in the usual manner.

The following is a typical recipe for the preparation of white wine in accordance with the invention.

| | |
|---|---|
| Grape juice | 170 ltr. |
| Potassium pyrosulfite | 40 g. |
| Seed mash | 7 ltr. |
| Alcohol (80%) | 10 ltr. |
| Lactitol | 5 kg. |
| Sodium cyclamate | 40 g. |

White wine thus produced has practically the same alcohol content, extract content and acidity as those of conventional white wines but contains little sugar. The mild sweetness of lactitol and the flavor of wine are well balanced by aging and the product can remain palatable for long periods. The product has the suitable sweetness of ordinary white wine, and is finely colored like the best of white wines, and yet has almost no energy value. With these features, the wine is a most suitable non-calory dietetic drink for diabetes and obesity.

EXAMPLE 10

Preparation of sweetened condensed milk

Raw milk whose fat content has been adjusted beforehand is subjected to flash pasteurization at 110° to 130°C. The milk is then boiled for a short time and, after the addition of lactitol in an amount equivalent to 15 percent of the amount of raw milk, the milk is condensed. By means of a cooler, the milk is cooled to a temperature below 15°C. and is treated so as to pulverize the lactose to finer crystals.

An exemplary composition of the milk is as follows:

| | |
|---|---|
| Water content | 26 % |
| Solid matters of whole milk | 29 % |
|   Fat | 8 % |
|   Protein | 7 |
|   Lactose | 12 |
|   Ash content | 1.5 |
| Lactitol | 45 |
| Sodium cyclamate | 0.2 |

This condensed milk has fine creamy luster and suitable viscosity. Since the fat content is thoroughly dispersed and the crystallization of lactose is avoided, the milk is pleasant to the palate. It is a low-calorie food with an extremely low calorie value, less than one sixth the values of conventional condensed milks.

EXAMPLE 11

Preparation of drops

Into 14 kg. of a 70% solution of lactitol are added 40 g. of sodium cyclamate and 40 g. of saccharin, with suitable amounts of acid and flavoring. The mixture is condensed in vacuum to a water content of one percent or less. The resultant upon cooling and shaping gives drops.

The product has refreshing sweetness and stable flavor and color. It remains palatable for long, and can be taken as non-caloric drops.

I claim:

1. A low-caloric carbonated soft drink containing a low caloric sweetening agent and a body producing agent, wherein both said agents consist essentially of lactitol.

2. A low-caloric sweetened condensed milk containing lactitol as a low-caloric sweetening agent and a viscosity increasing agent, said condensed milk consisting essentially of about 26% water, 29% milk solids and 45% lactitol.

3. A low caloric food or drink containing a low caloric sweetening agent and an agent for adding solid volume, body, moisture absorbance, luster and increased viscosity, wherein both said agents consist essentially of lactitol.

4. A highly concentrated orange juice syrup in accordance with claim 3 consisting essentially of about 7.5% of 1/3 concentrated orange juice, 76% of a 75% lactitol solution, 2% of a 50% citric acid solution and 14% water.

5. Ice cream in accordance with claim 3 consisting essentially of about 10% milk fat, 11% skim milk powder, 20% lactitol and 59% water.

6. A cake in accordance with claim 3 consisting essentially of about 30% lactitol, 34% egg, 28% flour and 8% water.

* * * * *